(12) United States Patent
Cardwell

(10) Patent No.: US 11,320,318 B1
(45) Date of Patent: May 3, 2022

(54) FLUID CONDUIT WITH TWO-WAY COMMUNICATION

(71) Applicant: Cooper Standard Automotive Inc., Northville, MI (US)

(72) Inventor: Brian J. Cardwell, Ypsilanti, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 0 days.

(21) Appl. No.: 17/070,872

(22) Filed: Oct. 14, 2020

(51) Int. Cl.
*G01K 7/22* (2006.01)
*G01K 1/143* (2021.01)
*G01L 1/22* (2006.01)
*G08C 17/02* (2006.01)
*G01M 3/00* (2006.01)
*G01D 11/24* (2006.01)

(52) U.S. Cl.
CPC .......... *G01K 1/143* (2013.01); *G01D 11/245* (2013.01); *G01K 7/22* (2013.01); *G01L 1/2287* (2013.01); *G01M 3/007* (2013.01); *G08C 17/02* (2013.01)

(58) Field of Classification Search
CPC ........ G01K 1/143; G01K 7/22; G01D 11/245; G01L 1/2287
See application file for complete search history.

(56) References Cited

U.S. PATENT DOCUMENTS

| 9,068,445 B2* | 6/2015 | Read ........................ E21B 47/13 |
| 9,287,936 B2* | 3/2016 | Ali ........................... H01Q 7/00 |
| 2017/0089496 A1* | 3/2017 | Lennon ................ G01M 5/0083 |

FOREIGN PATENT DOCUMENTS

GB 2403016 A * 12/2004 ............... G01F 1/58

\* cited by examiner

*Primary Examiner* — Jamel E Williams
(74) *Attorney, Agent, or Firm* — Paschall & Associates, LLC; Anthony Miologos; James C. Paschall

(57) ABSTRACT

This disclosure relates to fluid conduit that incorporates sensors printed on an exterior wall of the fluid conduit configured to sense an operating parameter of the fluid conduit. A two-way communication device communicatively connected to the printed electronic material is configured to wirelessly transmit the operating parameter to a mobile device.

16 Claims, 3 Drawing Sheets

FLUID CONDUIT WITH TWO-WAY COMMUNICATION

TECHNICAL FIELD

This disclosure is generally directed to a fluid conduit. More specifically, it relates to a fluid conduit incorporating a two-way communication device and method for the monitoring printed sensors located on the fluid conduit.

BACKGROUND

Fluid conduits are used in applications when connections are required for the transfer of liquids or gaseous media. The selection of a fluid conduit generally depends on the specific requirements of the intended use, with the result that a plurality of properties of the conduit such as e.g. diameter, minimum bend radius, pressure load and temperature resistance are required to be taken into account.

In many cases fluid conduits used in vehicles to transfer fluids do not include probes or other sensors physically attached to a conduit for measuring and monitoring safety-related operating parameters, such as, monitoring the temperature and volume flow of a medium flowing in the fluid conduit.

In principle it would be desirable to monitor the operating parameters of mediums flowing in the fluid conduits of a vehicle, such as, fuel delivery, cooling fluids used to cool an engine, hydraulic fluid used in steering and brake systems and pneumatic air systems. By directly monitoring the operating parameters of the conduits disruptions to the operation of these systems, as well as the vehicle, can be prevented. The possible causes of a disruption can be quickly diagnosed and identified by monitoring the operational parameters of the conduit. Such as pressure drops, temperature variations of the fluid conveyed by the conduit, as well as, excessive stress of the conduit material can be recognized and then remedied. In this way, the lifetime and reliability of the vehicle and fluid conduits can be increased, and conduit failures can be minimized.

Therefore, it is an object of the present invention to provide a fluid conduit which allows monitoring of operating and functionality parameters of the conduit in a simple manner. By way of example, the parameters to be monitored may include, but are not limited to, the temperature of the conduit wall and/or of the medium flowing in the conduit, the positive or negative pressure acting on the conduit wall, and the detection of the fluid leakage from the conduit wall leading to the integrity of the conduit and the degree of ageing of the material of the conduit.

SUMMARY

This disclosure relates to fluid conduit incorporating a two-way communication device and method for monitoring printed sensors located on the fluid conduit.

In a first embodiment, a fluid conduit includes an interior diameter and an exterior wall. Printed electronic material is deposited on the exterior wall of the fluid conduit. The printed electronic material is configured to sense an operating parameter of the fluid conduit. A two-way communication device communicatively connected to the printed electronic material is configured to wirelessly transmit the operating parameter to a mobile device.

In a second embodiment a method is provided. The method includes sensing at least one operating parameter of a fluid conduit. The fluid conduit including an interior diameter and an exterior wall. The method further includes printing electronic material on the exterior wall of the fluid conduit, the electronic material used to sense at least one operating parameter of the fluid conduit and wirelessly transmitting the operating parameter to a mobile device using a two-way communication device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
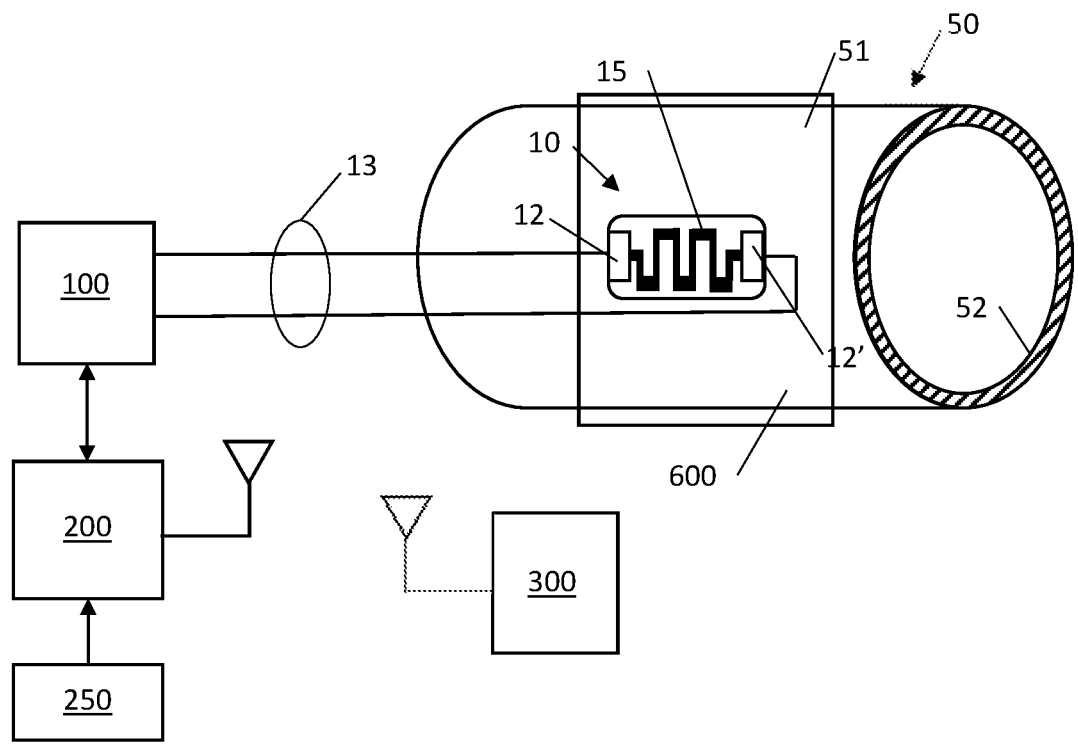
FIG. 1 illustrates an example fluid conduit having a temperature sensor printed on the conduit in accordance to the present disclosure.

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Within the meaning of this application, by the term "fluid conduit" is meant a semi-rigid conduit, as well as conduit couplings and parts thereof. The conduit usually takes the form of an elongated, cylindrical hollow body. At one or both of its ends, the conduit optionally has a conduit coupling or a part of a conduit coupling, a so-called fitting, by means of which the conduit can be connected to e.g. another conduit or other conduit units, such as a fixed pipe system or other parts of a pipe assembly.

In a preferred embodiment of the present disclosure, the wall of the conduit comprises thermoplastic material. Purely by way of example and non-imitatively, polyamides (PA) or Polyolefins such as polyethylene(PE) or polypropylene or their co-polymers or polyvinylchloride (PVC) or thermoplastic vulcanizates (TPV), such as Santoprene.

Such thermoplastic conduits can for example be produced in such a way that the thermoplastic material is extruded directly into the form of the desired conduit. Alternately, the thermoplastic material can, e.g. by means of extrusion, be transformed into the form of a material web, such as e.g. an extruded profiled rim or a film web, which is then wound helically and in which longitudinal edge sections of adjacent spiral windings, or the opposite edge areas of the material web, are connected to each other overlapping. Furthermore, it is also possible that the conduit wall comprises several plies or layers of the thermoplastic material which are arranged one on top of another e.g. in the form of several film plies ("sandwich construction").

The wall of the conduit according to the invention has a layer electronic material printed on the wall. In particular, the electronic material can be completely or partially embedded in the conduit wall. Alternately, it can be arranged in the form of a coating on the outside of the conduit or in the form of a coating of a component of the conduit wall. It is also possible that the printed electronic material is arranged evenly over the entire conduit wall or only in a part of it, such as a material web.

The printed electronic material has at least one material property which is variable depending on at least one operating parameter of the conduit. By "operating parameter" within the meaning of this application is meant a state variable of the conduit, which is selected in particular from the group consisting of the temperature of the conduit wall, e.g. the temperature in the inside of the conduit wall or the temperature on the inner surface of the conduit wall, with the result that the temperature of the medium located in the conduit can be inferred; the positive or negative pressure acting on the conduit wall and the integrity of the conduit wall due to leakage of fluid from the conduit wall due to a break in the conduit wall or ageing of the material of the conduit wall. The printed electronic material is formed such that it is suitable for determining at least one operating parameter.

The conduit according to the invention thus has the great advantage that, because of the electronic material contained on the conduit wall, one or more desired operating parameters of the conduit can be determined in a simple manner directly and without the use of external measuring probes.

The printed electronic material is preferably in the form of at least one sensor. The invention is based on printing on the exterior of the conduit at least one electronic sensor from electronic material. A single printed electronic sensor or several printed electronic sensors can be used. For example, it is possible to use a plurality of printed electronics in order to realize the same operating parameter several times or at several points of the conduit and or different functions individually or combined with one another.

It should be noted here that the exterior wall of the conduit is in a close relationship to the inside interior wall of the conduit, and therefore with, for example, the fluid located in the interior of the conduit. As a result, the operating parameters of the electronic material can be exercised close to the interior of conduit and the fluid contained therein. This can make the effect that a sensor comprised of printed electronic material, for example, can provide better measurement results due to the sensor being as close as possible to the interior of the conduit.

The production of the printed electronic material can take place via a printing process or via the combination of different printing processes. For example, the printed electronic material may be deposited on the conduit by means of a flexographic printing process, by means of a gravure printing process, by means of a screen-printing process and/or by means of a digital printing process. Thus, various printing methods can be used to utilize the respective properties to print the various printed electronics on the exterior wall of the conduit. The printing methods just described can be used, in the direct printing of printing inks for a desired sensor structure. Alternately, in a preparatory step, an adhesion promotion layer can be applied first to the exterior wall of the conduit before printing the desired sensor structures thereon. This would be desirable in situations wherein the exterior wall of the conduit is composed of a material that would be difficult to print on, such as, rubber or other rubber infused materials. Additionally, in still another preparatory step, the desired sensor structures may be made by laser engraving, in the conduit wall and then filling with the electronic material that forms the sensor structure and interconnecting conductor wiring.

Alternately, or additionally, the printed electronic material can be partially or completely formed by structuring during extrusion. Alternately, or additionally, the printed electronic material can be partially or completely replaced by the insertion of structures such as for examples tiles or grids formed as individual units and applied by any convenient means, such as an adhesive to the exterior wall of the conduit.

Preferably, the printed electronic material are only partially arranged on the conduit wall, so that sufficient portions remain, which are free of the printed electronic material. In this way, sufficient surface of the conduit wall can be kept free in order to achieve sufficient direct adhesion with a second layer, such as for example, a protective layer formed over the printed electronic material.

According to one aspect of the present invention, the conduit includes a protective layer of insulating material deposited on the outside wall of the conduit over the printed electronic material. In this way, the printed electronic material is covered and protected from damage from external influences caused by road debris and any environmental or mechanical effects in the operation of a vehicle.

In accordance to the present invention, the printed electronic materials are designed as sensors to detect an operating parameter of the conduit, such as for example, a temperature sensor, a pressure sensor or a leak detection sensor. As a result, at least one operating parameter of the conduit can be sensed, which is exerted on the exterior wall of the conduit from the interior. For example, a fluid conveyed by the conduit may transfer its temperature to the exterior wall of the conduit so that the temperature of the fluid can be detected by a temperature sensor.

According to another aspect of embodiment of the present disclosure a two-way communication system is provided connected to the printed electronic sensor. The two-way communication system receives the operating parameters detected by the electronic sensors and sends the information wirelessly to an external device for display. For example, the operating parameter sensed by a printed electronic sensor may be connected to a wireless Bluetooth Low Energy (BLE) hardware module installed on the fluid conduit and powered by a battery. The BLE module transmits the information to a remotely located mobile BLE device such as a smartphone or other mobile BLE hardware-equipped device executing specifically designed operating software. Upon a request for information by the mobile device via the operating software, the BLE module transmits the information received from the electronic sensor to the mobile BLE device, for display to a technician.

Alternately, the BLE module can be installed in an area remote from the printed electronic sensor. In this aspect of the disclosure, the electronic sensors printed on the conduit include conductor wires that are home-run to a terminal block. One or more sensors can have their conductors run to the terminal block. A controller including a processor unit and at least a BLE transceiver is connected to the terminal block. Upon request by the mobile BLE device the processor unit connects a selected sensor to the BLE transceiver for transmission of the sensors operating parameter to the mobile BLE device. The operating software may also be adapted to allow the technician to request information for one or more sensors at the same time, providing a list of operating parameters to the mobile BLE device from a plurality of electronic sensors.

Turning now to FIG. 1, a temperature sensor 10 is shown which is arranged as a negative temperature coefficient (NTC) thermistor on exterior wall 51 of fluid conduit 50. Thermistor material 15 is printed on the exterior wall 51 between conductive pads 12 and 12' and electrically connected to the thermistor 15. The conductive pads 12 and 12' are electrically connected to conductor wires 13. For an NTC thermistor, when the temperature of the thermistor material increases, the resistance sensed by the thermistor decreases. Conversely, when the temperature of the thermistor material decreases, the resistance of the thermistor material increases. A fluid conveyed by the conduit 50 may transfer its temperature to the exterior wall 51 of the conduit so that the temperature of the fluid can be detected by sensor 10.

The resistance sensed by the thermistor 15 of sensor 10 is applied to the wire network comprised of electrical conductors 13 that extend in the axial direction of the conduit parallel to the conduit axis or can also extend helically about the conduit axis. Alternately, the conductors 13 can be embedded in the exterior wall 51. The conductors 13 in FIG. 1 are run to a terminal block or a junction box, such as for example, terminal block 100. A controller 200 is connected to the terminal block 100 and is arranged to receive the resistance reading from the temperature sensor 10.

Figure 2:
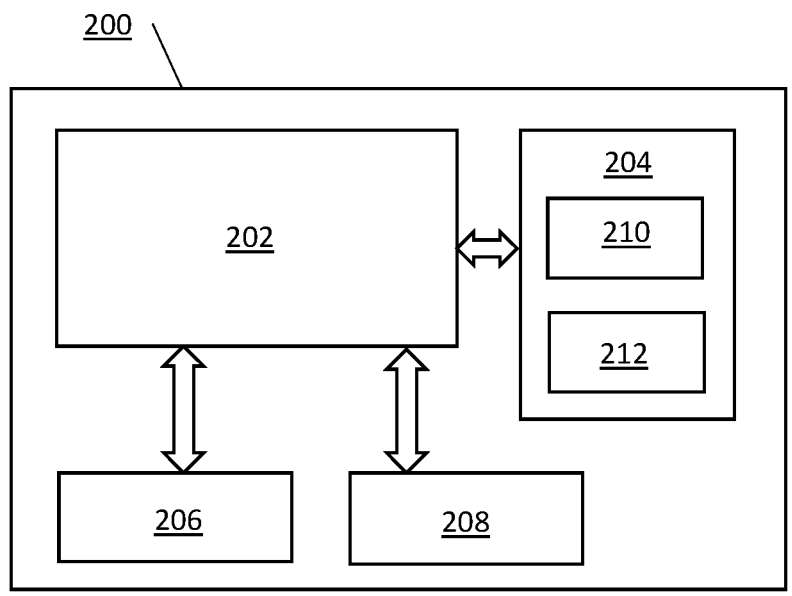
FIG. 2 illustrates an example controller in accordance with the present disclosure.

As shown in FIG. 2, the controller 200 includes at least one processor 202, at least one storage device 204, at least one communications unit 206, and at least one input/output (I/O) unit 208. Each processor 202 can execute instructions, such as those that may be loaded into a memory 212. The instructions could intelligently process queries from a remotely located mobile device and received by the communication unit 206. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random-access memory or any other suitable volatile or non-volatile storage device(s). The persistent storage 212 may contain one or more components or devices supporting longer-term storage of data, such as a read only memory, or flash memory.

The communications unit 206 supports communications with other systems or devices. For example, the communications unit 206 could include a wireless transceiver facilitating communications over a wireless network. The communications unit 206 may support communications through any suitable wireless communication link. For example, the wireless transceiver can include a BLUETOOTH low energy (BLE) transceiver that communicates wirelessly using a BLE protocol.

The I/O unit 208 allows for input and output of data. For example, for the thermistor 15, the I/O unit 208 receives the output signals from conductors 13 connected to terminal block 100. The I/O unit 208 may also include connections for user input through a keyboard, mouse, keypad, touchscreen, or other suitable input device. The I/O unit 208 may also send output to a display, printer, or other suitable output device.

With renewed reference to FIG. 1, the resistance readings output by temperature sensor 10 are applied to terminal box 100 via conductors 13. It should be noted that terminal box 100 can be connected to a plurality of sensors from conduits 50 located in various locations on a vehicle via conductors terminated at terminal box 100. In this manner, the controller 200 can receive and process the output signals from a network of sensors located on conduits from a plurality of locations on the vehicle.

For the example shown in FIG. 1, the I/O unit 208 receives the output signals from the terminal block 100 sent from temperature sensor 10. The processor 202 in accordance to its operating software can convert the output signals from the temperature sensor 10 that are in the form of analog resistance values to digital data. The digital output signals could be subsequently stored in memory device 204 with a time stamp and location data that identifies the location of the sensor or conduit on the vehicle. In this manner, a log of historical data readings for a period of time from various locations of a vehicle can be built and stored in memory device 204.

The controller 200 is adapted to operate with a mobile BLE hardware equipped device operated by a technician from a remote location, such as a smartphone, a handheld computer or a data tablet. In accordance with an aspect of the present invention, the controller communication unit 206 includes a BLUETOOTH low energy (BLE) transceiver communicating wirelessly using a BLE protocol. A wireless BLE communication link is intended to be established between a BLE transceiver located in the mobile BLE device 300 and the controller BLE transceiver. The controller is powered by a source of power 250. The source of power 250 can be a dedicated battery, such as a lithium power cell, that can be replaced when required or charged using any useful method of harvesting energy from the vehicle's operation. Alternately, or additionally the power source can be connected to and receive power from the vehicles electrical distribution system.

Upon request by the mobile device 300 the controller 200 process the request to transmit data from the temperature sensor 10 to mobile BLE device 300. Based on the type of request, the processor either provides digital data representing the real-time sensor readings or the historical log data stored in the memory device 204. The requested data is transferred to the communication unit 206 and the BLE transceiver for transmission to the requesting mobile BLE device 300.

Although FIGS. 1 and 2 illustrate an examples of a fluid conduit 50 incorporating printed sensors and a two-way communication method for monitoring the sensors, various changes may be made to FIGS. 1 and 2. For example, various components in each figure could be combined, further subdivided, or omitted and additional components could be added according to particular needs. Also, mobile BLE hardware equipped devices come in a wide variety of configurations, and FIGS. 1 and 2 do not limit this disclosure to any particular mobile BLE equipped device.

Figure 3:
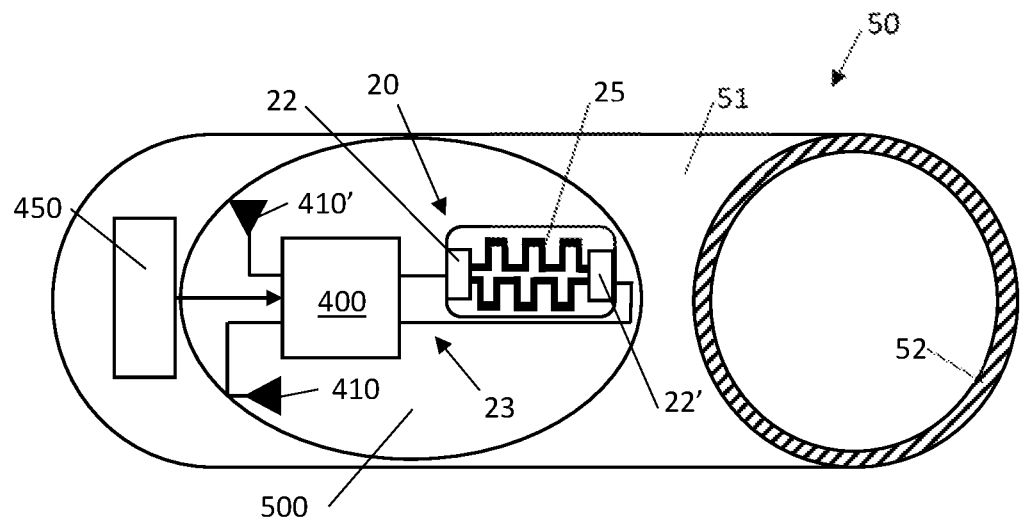
FIG. 3 illustrates a fluid conduit having a strain gauge sensor printed on the conduit including a two-way communication module in accordance with the present disclosure.

Turning now to FIG. 3 another aspect of the current disclosure is shown. In this aspect, a strain gauge sensor 20 is shown. The printed electronic material for a strain gauge 20 is printed on the exterior wall 51, of fluid conduit 50. Strain gauges are known in the state of the art and constitute devices for recording elongation and compression deformations. Deformations of the strain gauge, changes the electrical resistance of the strain gauge, with the result that it is possible to use the electrical resistance of the strain gauge, to infer deformations of the fluid conduit 50 due to the pressure applied by the fluid to the inside wall 52, or due to a mechanical elongation or compression of conduit 50. As was explained above for the temperature sensor 10, the strain gauge electronic material is directly deposited by printing the strain gauge restive elements 25 directly on the exterior wall 51 of conduit 50 between conductive pads 22 and 22'. Conductive pads 22 and 22' electrically connect to the strain gauge resistive elements 25 and are in turn electrically connected to electrical conductors 23.

Conductors 23 are connected to a BLE module 400. The BLE module 400 is attached directly to wall 51. The BLE module can be attached to wall 51 proximate the strain gauge sensor 20, however, it may also be attached in any convenient area of the conduit, where the effects of temperature and vibrations are minimized. Any suitable method of attaching the BLE module 400 to wall 51 can be used, such as, an adhesive that is compatible with the material composition of the fluid conduit 50. A set of antennas 410, 410' are connected to the BLE module 400 and used to receive and transmit wireless signals from module 400. The antennas 410 and 410' can be printed directly on wall 51 from a conductive material. The antennas 410, 410' can also be formed from conductive wire and attached to the conduit 50 by using an adhesive in the same manner as the BLE module. As can be seen in FIG. 3, in order to provide the best possible wireless reception and transmission quality, the antennas are mounted to wall 51 of the conduit 50 with antenna 410 oriented 90 degrees to antenna 410'. This provides diversity in the antenna radiation pattern leading to enhanced signal quality in the wireless communication link between the BLE devices.

A battery 450 is attached to wall 51 and electrically connected to the BLE module 400. The battery 450 can be a comprised of a lithium ion cell and arranged to provide power to operate the BLE module 400. The battery 450 can be attached directly to wall 51 of the conduit using any suitable method for attaching the battery, such as for example, an adhesive. Alternately, the battery can also be installed in a battery housing and the battery housing attached to the conduit 50 using any suitable method. The installation of the battery 450 in a battery housing would make the replacement of the battery more convenient.

The BLE module 400 is adapted to establish a two-way wireless communication link with a mobile BLE device 300 such as a smartphone or other mobile BLE hardware-equipped device. The mobile BLE device 300 uses specifically developed operating software and the BLE protocol to establish a wireless communication link with the BLE module via antennas 410 and 410'. Upon a request for information transmitted to the BLE module 400, from the mobile BLE device 300, the BLE module 400 transmits the operating information sensed by sensor 20 to the mobile BLE device 300 using the BLE protocol. The mobile BLE device 300 using the operating software converts the sensor data to data compatible for display on the mobile BLE device.

Figure 4:
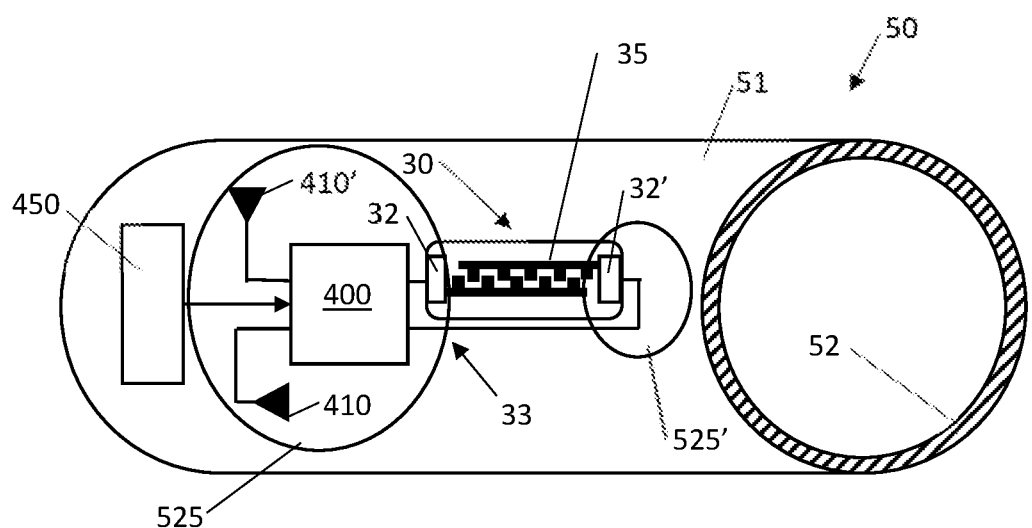
FIG. 4 illustrates a fluid conduit having a leak detection sensor printed on the conduit including a two-way communication module in accordance with the present disclosure.

Turning now to FIG. 4 a leak detection sensor 30 in accordance to the disclosure is shown. The electronic material for the leak detector 30 is printed to the exterior wall 51 of fluid conduit 50. The electronic material for a leak detector 30 comprises a series of conductive traces or legs 35 that are printed on exterior wall 51 between conductive pads 32 and 32'. The conductive traces 35 can be printed on a single specific area of the conduit, at multiple areas of the conduit or along the entire length of the conduit 50. In principle, measurement of a fluid leak by the leak detector is based on the conductivity read at the conductive traces 35. When something conductive, such as a fluid touches them, it registers as a change in conductivity, such as for example, a short circuit. The conductive traces are electrically connected to electrical conductors 33.

Conductors 33 are connected to BLE module 400 in a same manner as was explained in FIG. 3. The BLE module 400 is attached directly to wall 51 proximate the leak detection sensor 30. The BLE module 400 is adapted to establish a two-way wireless communication link with a mobile BLE device 300 such as a smartphone or other mobile BLE hardware-equipped device. The mobile BLE device using specifically developed operating software and the BLE protocol can establish a wireless communication link with the BLE module via antennas 410 and 410'. Upon a request for information transmitted to the BLE module 400, from the mobile BLE device 300, the BLE module 400 transmits the operating information sensed by sensor 30 to the mobile BLE device 300 using the BLE protocol. The mobile BLE device 300 using the operational software converts the sensor data to data compatible for display on the mobile BLE device.

Figure 5:
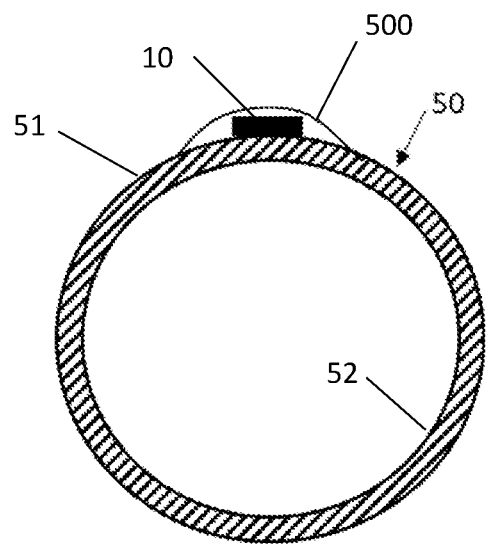
FIG. 5 is a sectional view illustrating a fluid conduit having a printed sensor printed on the conduit including a protective layer in accordance with the present disclosure.

As was explained earlier and which can be best seen at FIG. 3 and FIG. 5, the conduit can include a protective layer 500 deposited on exterior wall 51 over the printed sensors, conductors, BLE module and antennas. The protective layer 500 can be composed of, for example, an insulating or di-electric ink composition, an epoxy or other insulating resin, a thermoplastic resin or thermoplastic elastomer that may be applied over the electrical components printed or attached to the wall 51 of conduit 50, including the BLE module 400 and antennas 410, 410'.

Figure 6:
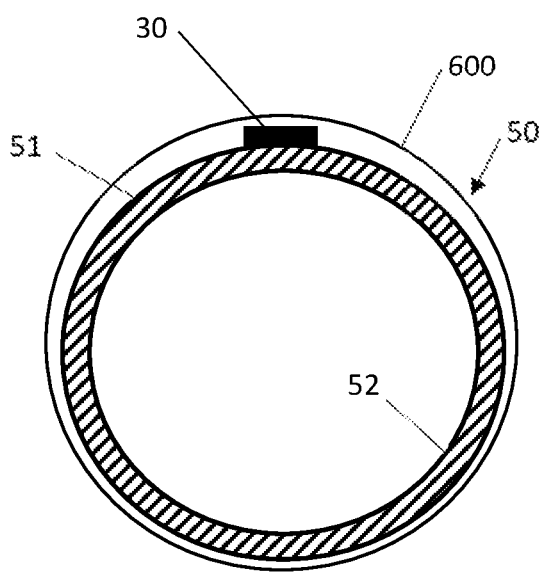
FIG. 6 is a sectional view illustrating a fluid conduit having a printed sensor printed on the conduit including a protective layer in accordance with the present disclosure.

Alternately, the protective layer can be deposited over the entire circumference of the conduit 50 where the electrical components are located, such as the protective layer 600 shown in FIG. 1 and FIG. 6, thereby encasing an entire section of wall 51 of the conduit 50. This particular method would be used, for example, to protect printed sensors that are located along the entire length of an exterior wall of a conduit 50, such as to protect for example, a strip of temperature sensors 10 or strain gauge sensors 20. Protective layers 500 and 600 cover and effectively pot the printed sensors and their wire networks protecting them from damage by external influences caused by road debris, weather, road hazards or other mechanical effects of the operation of a vehicle. Alternately, the protective layer could cover only specific areas of the sensor that are located along the conduit 50. As is shown in FIG. 4, this method would be used to protect, for example, a strip of leak detection sensors 30. A protective layer, for example, 525 and 525' would effectively pot only specific portions of the printed sensors. BLE modules and their wire networks, allowing the conductive traces 35 of a leak detector 30 exposed to enable the detection of fluid leaks.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element,"

"member," "apparatus," "machine," "vessel," or "system," within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A fluid conduit having an interior diameter and an exterior wall, the fluid conduit comprising:
    electronic material printed on the exterior wall of the fluid conduit, the printed electronic material configured to sense at least one operating parameter of the fluid conduit and to provide output signals representing the sensed operating parameter; and
    an electrical conductor for communicating deposited on the exterior wall of the fluid conduit communicatively coupling the output signals to a controller;
    wherein the controller includes a wireless two-way communication unit adapted to receive the output signals and transmit the output signals from the wireless two-way communication unit using a two-way communication protocol.

2. The fluid conduit according to claim 1, wherein the at least one operating parameter of the conduit is selected from a group consisting of the temperature of the conduit wall, the positive or negative pressure acting on the conduit wall, or the integrity of the conduit wall.

3. The fluid conduit according to claim 1, wherein the printed electronic material produces at least one sensor element configured to sense and provide output signals representing a sensed operating parameter of the fluid conduit.

4. The fluid conduit according to claim 3, wherein the at least one sensor element is selected from a group consisting of electrical conductors and resistive elements, the electrical conductors and resistive elements combined to form at least one of:
    a temperature sensor for measuring the temperature of the wall;
    a strain gauge sensor for measuring the positive or negative pressure acting on the conduit wall;
    a leak detection sensor, for measuring the integrity of the conduit wall.

5. The fluid conduit according to claim 1, wherein the electronic material is printed on the conduit wall by at least one of:
    a flexographic printing process;
    a gravure printing process;
    a screen printing process; or
    a digital printing process.

6. The fluid conduit according to claim 3, wherein the wireless two-way communication unit includes a BLUETOOTH low energy (BLE) communication transceiver and antenna operating on a BLE communication protocol, the BLE transceiver adapted to transmit the output signals of the at least one sensor element from the antenna using the BLE communication protocol upon receiving a request from a mobile device.

7. A method for sensing at least one operating parameter of a fluid conduit, the fluid conduit including an interior diameter and an exterior wall, the method comprising:
    printing electronic material on the exterior wall of the fluid conduit, the electronic material used to sense the at least one operating parameter and to provide output signals representing the sensed operating parameter;
    depositing an electrical conductor for communicating on the exterior wall of the fluid conduit communicatively coupling the output signals to a controller, the controller including a wireless two-way communication unit; and
    transmitting the output signals from the wireless two-way communication unit using a two-way communication protocol.

8. The method of claim 7, wherein the at least one operating parameter is selected from a group consisting of the temperature of the conduit wall, the positive or negative pressure acting on the conduit wall and the integrity of the conduit wall.

9. The method of claim 7, wherein the method further comprises: producing at least one sensor element from the printed electronic material, the sensor element configured to sense and provide output signals representing a sensed operating parameter of the fluid conduit.

10. The method of claim 9, wherein the method further comprises: selecting the at least one sensor element from a group consisting of electrical conductors and resistive elements, the electrical conductors and resistive elements combined to form at least one of:
    a temperature sensor for measuring the temperature of the conduit wall;
    a strain gauge sensor for measuring the positive or negative pressure acting on the conduit wall; and
    a leak detection sensor for measuring the integrity of the conduit wall.

11. The method according to claim 9, wherein the two-way communication unit includes a BLUETOOTH low energy (BLE) communication transceiver and antennae operating on a BLE communication protocol, the BLE transceiver adapted to:
    transmit the output signals of the at least one sensor element from the antennae using the BLE communication protocol upon receiving a request from a mobile device.

12. The method of claim 7, wherein the method further includes:
    depositing a protective layer of at least one of an insulating ink, a di-electric ink, a thermoset or cross-linked resin such as epoxy, an insulating resin, a thermoset or cross-linked elastomer, or a thermoplastic elastomer over the printed electronic material, electrical conductor for communicating.

13. A fluid conduit having an interior diameter and an exterior wall, the fluid conduit comprising:
    at least one sensor element comprised of electronic material printed on the exterior wall of the fluid conduit, the printed electronic material configured to sense at least one operating parameter of the fluid conduit and to provide output signals representing the sensed operating parameter; and
    a wireless module that includes at least one antenna, the wireless module and antenna attached to the fluid conduit, the wireless module communicatively connected to the at least one sensor element and adapted to transmit the output signals from the antenna using a two-way wireless communication protocol.

14. The fluid conduit according to claim 13, wherein the fluid conduit further includes a protective layer composed of at least one of an insulating ink, a di-electric ink, a thermoset or cross-linked resin such as epoxy, an insulating resin, a thermoset or cross-linked elastomer, or a thermoplastic elastomer deposited over the printed electronic material, wireless module and antenna.

15. The fluid conduit according to claim 14, wherein the protective layer is deposited over the entire circumference of the conduit where the printed electronic material, wireless module and antenna are located.

16. The fluid conduit according to claim 13, wherein the wireless module is a BLUETOOTH low energy (BLE) communication device operating on a BLE communication protocol, the BLE communication device adapted to transmit the output signals representing a sensed operating parameter from the antenna using the BLE communication protocol upon receiving a request from a mobile device.

\* \* \* \* \*